(12) United States Patent  
Rosenboom (10) Patent No.: US 7,280,550 B1  
(45) Date of Patent: Oct. 9, 2007

(54) BANDWIDTH OPTIMIZATION OF RING TOPOLOGY THROUGH PROPAGATION DELAY COMPENSATION

(75) Inventor: Gerrit Eimbertus Rosenboom, Longmont, CO (US)

(73) Assignee: Cirrus Logic, Inc., Austin, TX (US)

( * ) Notice: Subject to any disclaimer, the term of this patent is extended or adjusted under 35 U.S.C. 154(b) by 1086 days.

(21) Appl. No.: 10/323,016

(22) Filed: Dec. 18, 2002

(51) Int. Cl.
 *H04L 12/28* (2006.01)
 *H04J 3/06* (2006.01)

(52) U.S. Cl. ............ 370/404; 370/452; 370/508; 370/519

(58) Field of Classification Search .......... 370/401, 370/404, 445, 447, 452, 503, 508, 519, 358; 375/371, 356, 358; 714/755
See application file for complete search history.

(56) References Cited

U.S. PATENT DOCUMENTS

| | | | |
|---|---|---|---|
| 4,596,025 A | 6/1986 | Satoh | |
| 5,107,490 A | 4/1992 | Wilson et al. | |
| 5,206,857 A | * 4/1993 | Farleigh | 370/452 |
| 5,379,299 A | 1/1995 | Schwartz | |
| 5,936,969 A | 8/1999 | Stiegler et al. | |

* cited by examiner

*Primary Examiner*—Afsar Qureshi
(74) *Attorney, Agent, or Firm*—Dan Shifrin (57) ABSTRACT

In a ring topology digital network propagation delay is reduced A master node transmits a clock signal into the network in one direction. Each slave node propagates the signal to the next slave node without regeneration until the signal is received by the master node. The amount of time the signal takes to travel around the ring, is measured and is the total ring propagation delay. The master node then transmits a clock signal in both directions to the first slave node which measures the difference in their arrival times and transmits the difference to the master node. The process is repeated for each other slave node. Based upon each difference the master node computes the propagation delay for each ring segment. The master node transmits to each slave node the corresponding ring segment propagation delay and each slave node adjusts the phase of the node's clock.

19 Claims, 8 Drawing Sheets

Fig. 1

(Prior Art)

BANDWIDTH OPTIMIZATION OF RING TOPOLOGY THROUGH PROPAGATION DELAY COMPENSATION

TECHNICAL FIELD

The present invention relates generally to the field of ring topology digital networks and, in particular, to improving clock synchronization among nodes on the network whereby loss of bandwidth due to skewing from propagation delay is reduced.

BACKGROUND ART

Figure 1:
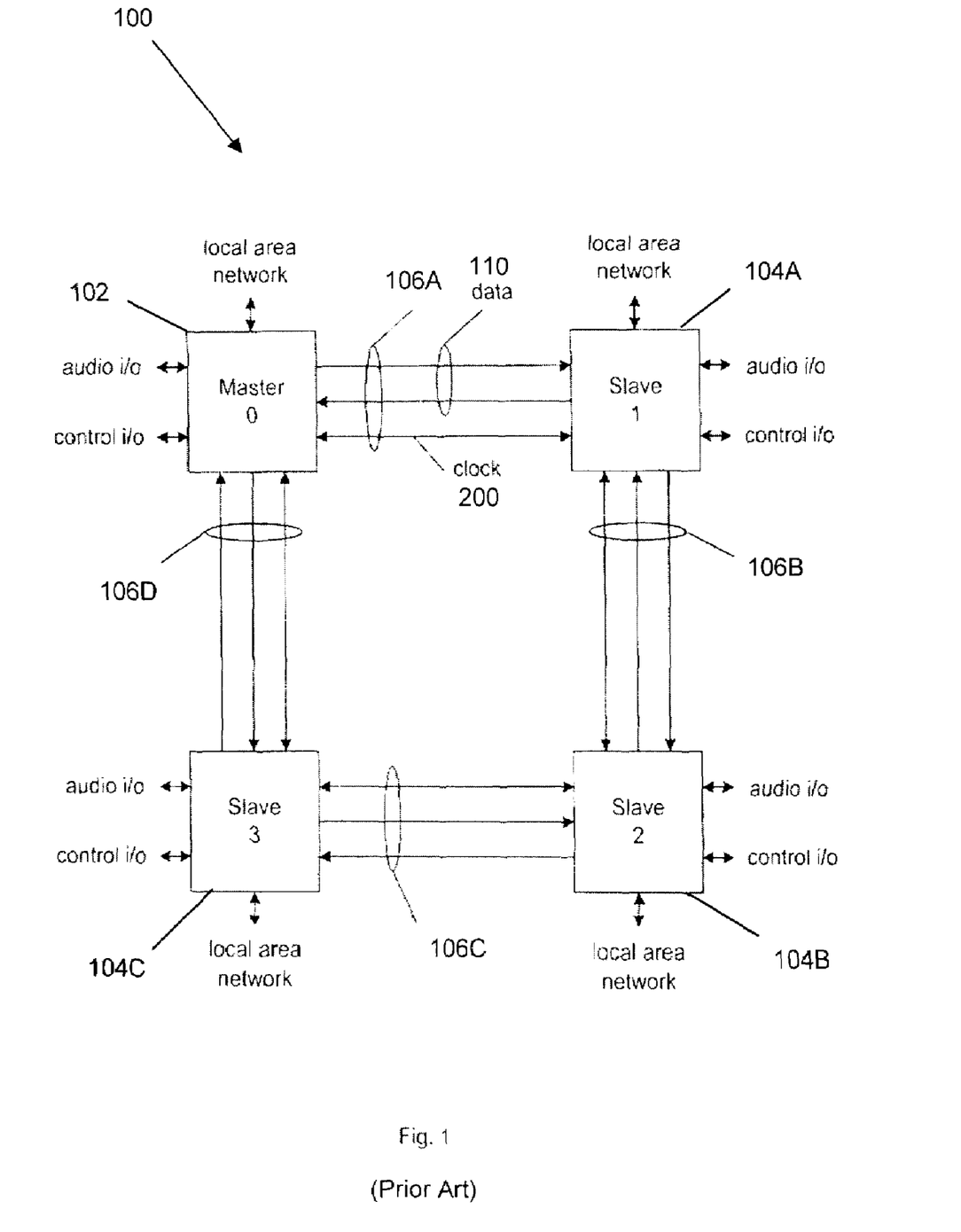
FIG. 1 is a schematic block diagram of a four-node ring network.

A ring topology network is a high bandwidth, high speed, low latency network configured as a ring which includes a plurality of nodes, each of which is coupled to two adjacent nodes. One node is designated as a master node which coordinates traffic on the network, the remaining N nodes are designated as slave nodes. It will be understood that the "first" and "last" slave nodes are both coupled to the master to complete the ring. FIG. 1 schematically illustrates a ring network 100. Although a network may, of course, include any number of nodes, for clarity and ease of description, the network 100 was chosen to include a master node 102 and N=3 slave nodes 104A, 104B, and 104C. It will be appreciated that the invention claimed herein is not limited to being incorporated into a network of any particular size. Adjacent nodes are coupled or interconnected by ring segments 106A, 106B, 106C and 106D which may comprise both data and clock lines.

A ring network may be employed to distribute uncompressed, real-time, single- or multiple-channel digital audio, clocking and control data to/from various audio and control devices. Audio sources, signal processing, amplification and sound projection may be distributed throughout a facility, all interconnected by electrical or optical cabling. Thus, any (single or multiple) audio input may be routed to any (single or multiple) audio output with each input and each output being capable of being processed and amplified individually.

Figure 2:
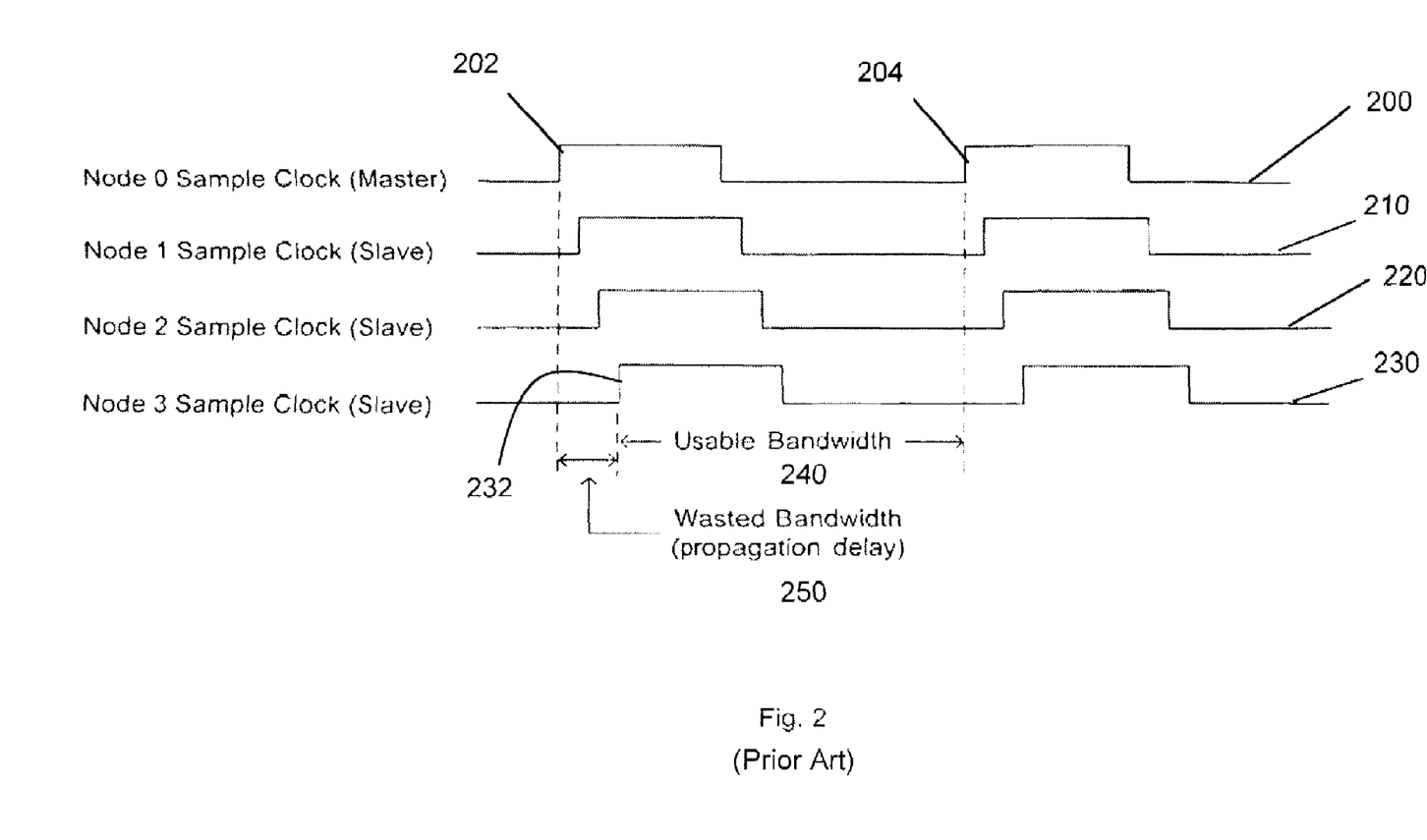
FIG. 2 illustrates the sample clock signals from each node in the network of FIG. 1.

Within each node on the network is a sample clock running synchronously relative to the clocks of the other nodes. Each ring segment 106 includes half-duplex, bi-directional path on which a clock signal 200 (FIG. 2) originating with the master node 102 is routed to each slave node 104. Additionally, the ring segments 106 include a full-duplex, bi-directional data path 110. In an audio environment, audio data is transferred between nodes along the data path 110. Referring to FIG. 2, the data transfer is initiated by a sample clock edge 202 and must be completed by the next sample clock edge 204. Thus, the full bandwidth extends between two sequential sample clock edges and in an ideal network without any propagation delay, a clock signal could be transmitted instantly to each slave node, thus ensuring perfect clock synchronism and properly timed audio output signals.

However, due to the physical length of each ring segment, a propagation delay occurs in each segment, thereby skewing each slave node's sample clock signal relative to the master clock signal 200. Such skewing is illustrated in FIG. 2 in which the clock signal from the first slave node 104A is represented by the signal 210, the clock signal from the second slave node 104B is represented by the signal 220 and the clock signal from the third slave node 104C is represented by the signal 230. The result of the skewing over the entire network is a reduction of the usable bandwidth 240 to that which extends between the first clock edge 232 of the third slave clock signal 230 and the next clock edge 204 of the master clock signal 200. The remaining "bandwidth" 250 is unusable.

Consequently, there is a need for improving the usable bandwidth in a ring topology network.

SUMMARY OF THE INVENTION

The present inventions provides apparatus and methods for reducing loss of bandwidth due to clock skewing from propagation delay be improved clock synchronization among nodes in a ring topology digital network environment. First, the total ring propagation delay is determined. The master node transmits a clock signal into the network in one direction. Each slave node propagates the signal to the next slave node without regeneration until the signal is received by the master node. The amount of time the signal takes to travel around the ring, based on the signal's time of transmission from the master node and time of arrival at the master node, is measured. The master node then transmits a clock signal in both directions to the first slave node. The first slave node receives both signals and measures the difference in the two signals' arrival times. The process is repeated for each other slave node. Each slave node transmits the arrival time difference back to the master node. Based upon the arrival time difference for each slave, the master node computes the propagation delay for each slave's ring segment. The master node then transmits to each slave node the corresponding ring segment propagation delay and each slave node adjusts a phase locked loop (PLL) to adjust the phase of the node's clock whereby all of the slave clocks are in phase with each other and with the master node.

Each node in the network may include the same clock circuitry with master and slave nodes being distinguished by internal configurations. The clock portion of a node includes clock circuitry, a phase detector and a loop filter. An output of the phase detector is a signal representing the phase difference between two signals received at first and second inputs. The clock portion further includes configurable input and output ports and switching devices to permit the node to be configured as master or slave nodes. A first port may be configured as either a first input port or a first output port through the use of a first control line. Similarly, a second port may be configured as either a second input port or a second output port through the use of a second control line.

A master/slave switch permits the clock circuitry to operate in a normal mode (in the master position) or be phase adjusted (in the slave position). First and second source clock select switches permit the first and second output ports, respectively, to output either the internal clock signal from the clock portion or pass through a clock signal received through the second and first input ports, respectively. A master clock select switch permits the first input to the phase detector to receive either the internal clock signal from the clock portion or a clock signal received through the second input port. A reference clock select switch permits the second input to the phase detector to receive either a clock signal received through the first input port or a clock signal received through the second input port.

DETAILED DESCRIPTION OF THE PREFERRED EMBODIMENT

Figure 3A:
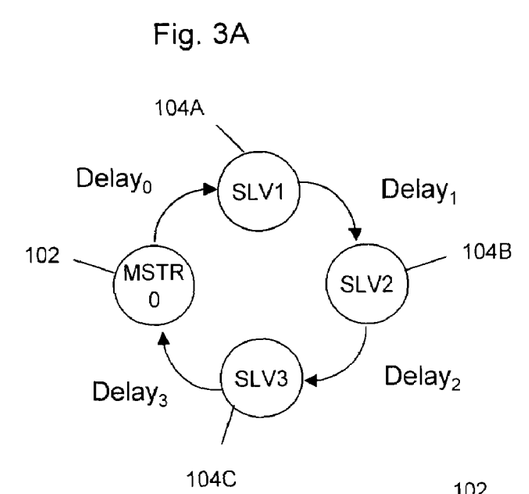
FIGS. 3A-3D illustrate the flow of clock signals during the bandwidth optimization process of the present invention.
Figure 4:
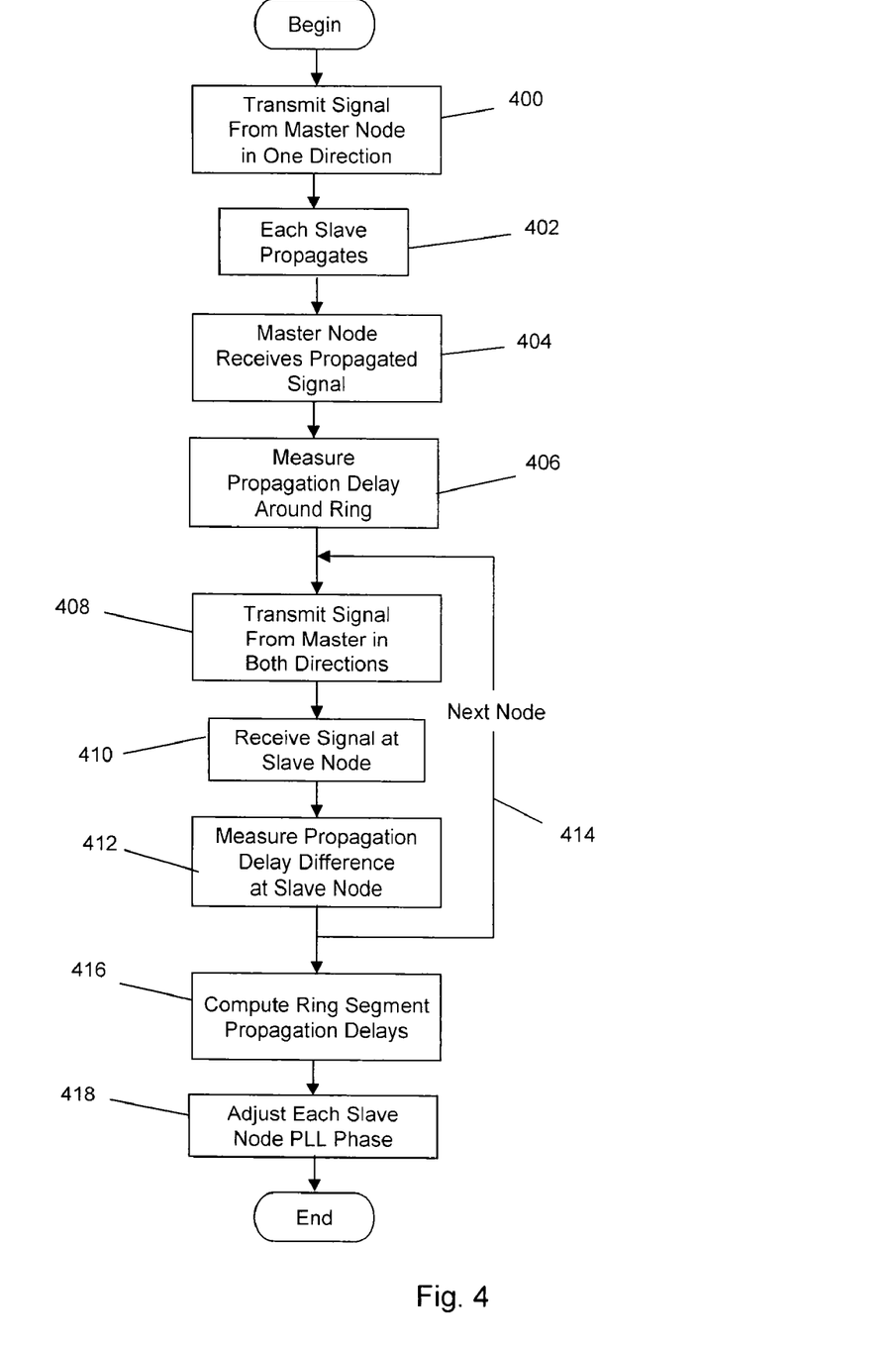
FIG. 4 is a flow chart of the bandwidth optimization process of the present invention.

The process of the present invention will be described with reference to FIGS. 3A-3D and the flow chart of FIG. 4. First, the total ring propagation delay is determined. The master node 102 transmits a clock signal into the network in one direction (FIG. 3A, step 400). Each slave node 104A, 104B and 104C propagates the signal to the next slave node without regeneration (step 402) until the signal is received by the master node 102 (step 404). The amount of time $\text{diff}_0$ the signal takes to travel around the ring, based on the signal's time of transmission from the master node 102 and time of arrival at the master node 102, is measured (step 406).

Figure 3B:
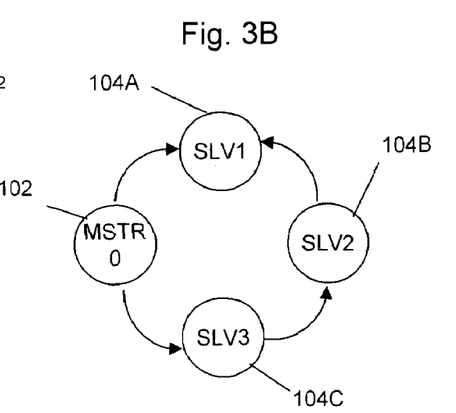
Figure 3C:
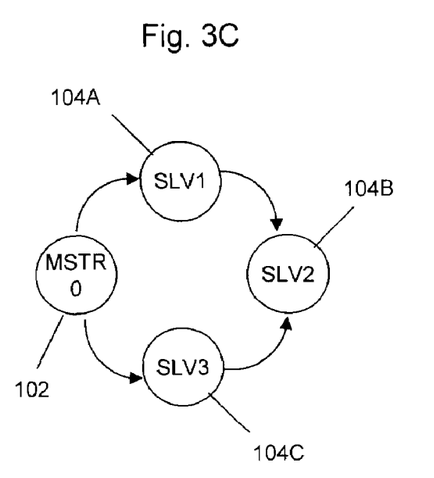
Figure 3D:
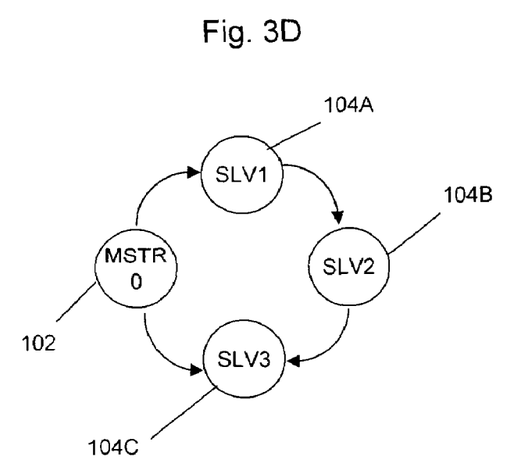

The master node 102 then transmits a clock signal in both directions to the first slave node 104A (FIG. 3B, step 408). The first slave node 104A receives both signals (step 410) and measures the difference in the two signals' arrival times $\text{diff}_1$ (step 412). The process is repeated for each other slave node (FIGS. 3C and 3D, step 414).

Each slave node 104 transmits the arrival time difference $\text{diff}_i$, back to the master node 102. Based upon the arrival time difference for each slave node, the master node 102 computes the propagation delay $\text{delay}_i$ for each ring segment (step 416) as follows:

| | |
|---|---|
| $\text{delay}_i = (\text{diff}_i - \text{diff}_{i+1})/2$ | for each $< N$, and |
| $\text{delay}_i = (\text{diff}_i + \text{diff}_0)/2$ | for i = N, | where N equals the number of slave nodes in the ring.

The master node 102 then transmits to each slave node 104 the corresponding propagation delay and each slave node 104 adjusts a phase locked loop (PLL) to adjust the phase of the node's clock whereby all of the slave clocks are in phase with each other and with the master node (step 418).

Figure 5:
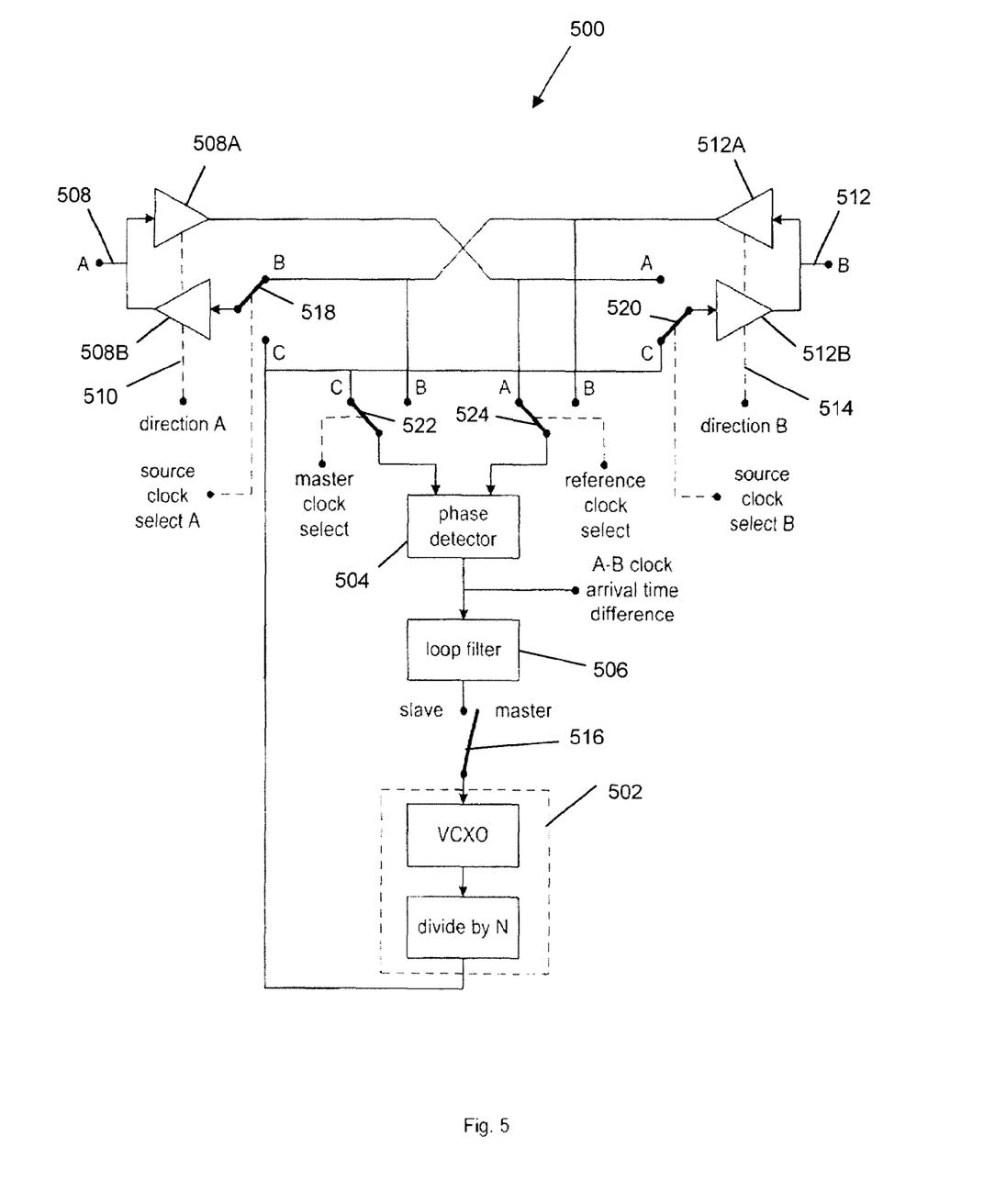
FIG. 5 is a block diagram of a node of the present invention.

Each node may include the same clock circuitry with master and slave nodes being distinguished by internal configurations. FIG. 5 is a block diagram of the clock portion 500 of a generic node. The clock portion 500 includes clock circuitry 502, a phase detector 504 and a loop filter 506. An output of the phase detector is a signal representing the phase difference between two signals received at first and second inputs. The clock portion 500 further includes configurable input and output ports and switching devices to permit the node to be configured as master or slave nodes. A first port 508 may be configured as either a first input port 508A or a first output port 508B through the use of a first control line 510. Similarly, a second port 512 may be configured as either a second input port 512A or a second output port 512B through the use of a second control line 514.

A master/slave switch 516 permits the clock circuitry to operate in a normal mode (in the master position) or be phase adjusted (in the slave position). First and second source clock select switches 518 and 520 permit the first and second output ports 508B and 512B, respectively, to output either the internal clock signal from the clock portion 502 or pass through a clock signal received through the second and first input ports 512A and 508A, respectively, A master clock select switch 522 permits the first input to the phase detector 504 to receive either the internal clock signal from the clock portion 502 or a clock signal received through the second input port 512A. A reference clock select switch 524 permits the second input to the phase detector 504 to receive either a clock signal received through the first input port 508A or a clock signal received through the second input port 512A.

Figure 6:
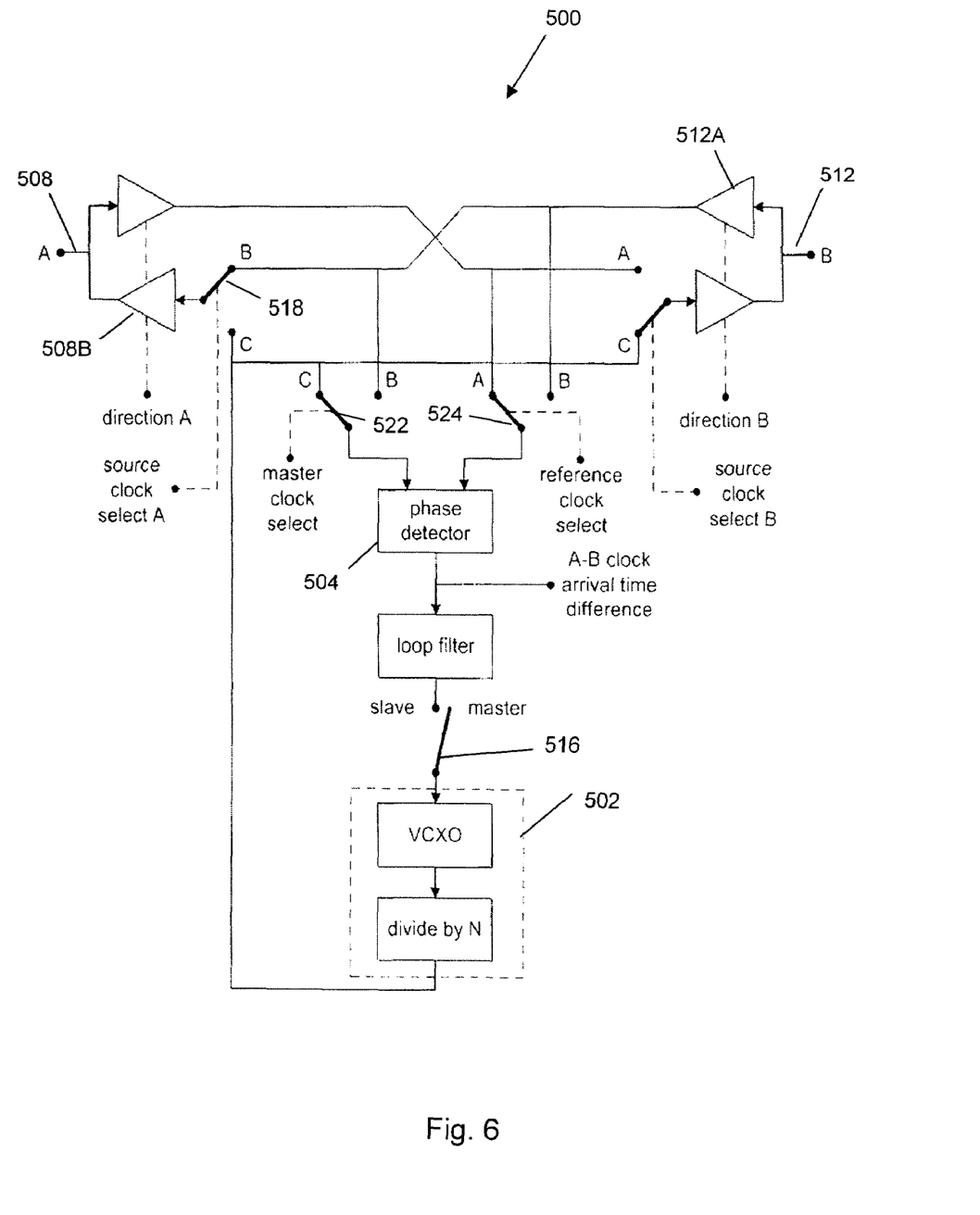
FIG. 6 is a block diagram of the node of FIG. 5 in a first master node configuration.

FIG. 6 is a block diagram of the node 500 in a first master node configuration. The first output port 508B and the second input port 512A are enabled. The master/slave switch 516 is set to the master position. The first source clock select switch 518 is positioned to couple the first output port 508B to the output of the clock portion 502. The master clock select switch 522 is positioned to couple the first detector select input to the output of the clock portion 502 and the reference clock select switch 524 is positioned to couple the second detector select input to the second input port 512A. In the first master node configuration (see also FIG. 3A), the master node 102 transmits a clock signal out of the first output port 508B onto the network in a first direction; the clock signal is simultaneously received at the first detector input. The clock signal is received by the first slave node 104 through an input port and, by an appropriate configuration of switches, merely passes the clock signal out through an output port without processing it through the node's clock portion. After the clock signal has traveled around the network 100, it is received through the second input port 512A of the master node 102 and applied to the second detector input. The phase detector 504 determines the difference in arrival times between the original clock signal and the returning clock signal and stores the difference $\text{diff}_0$.

Figure 7:
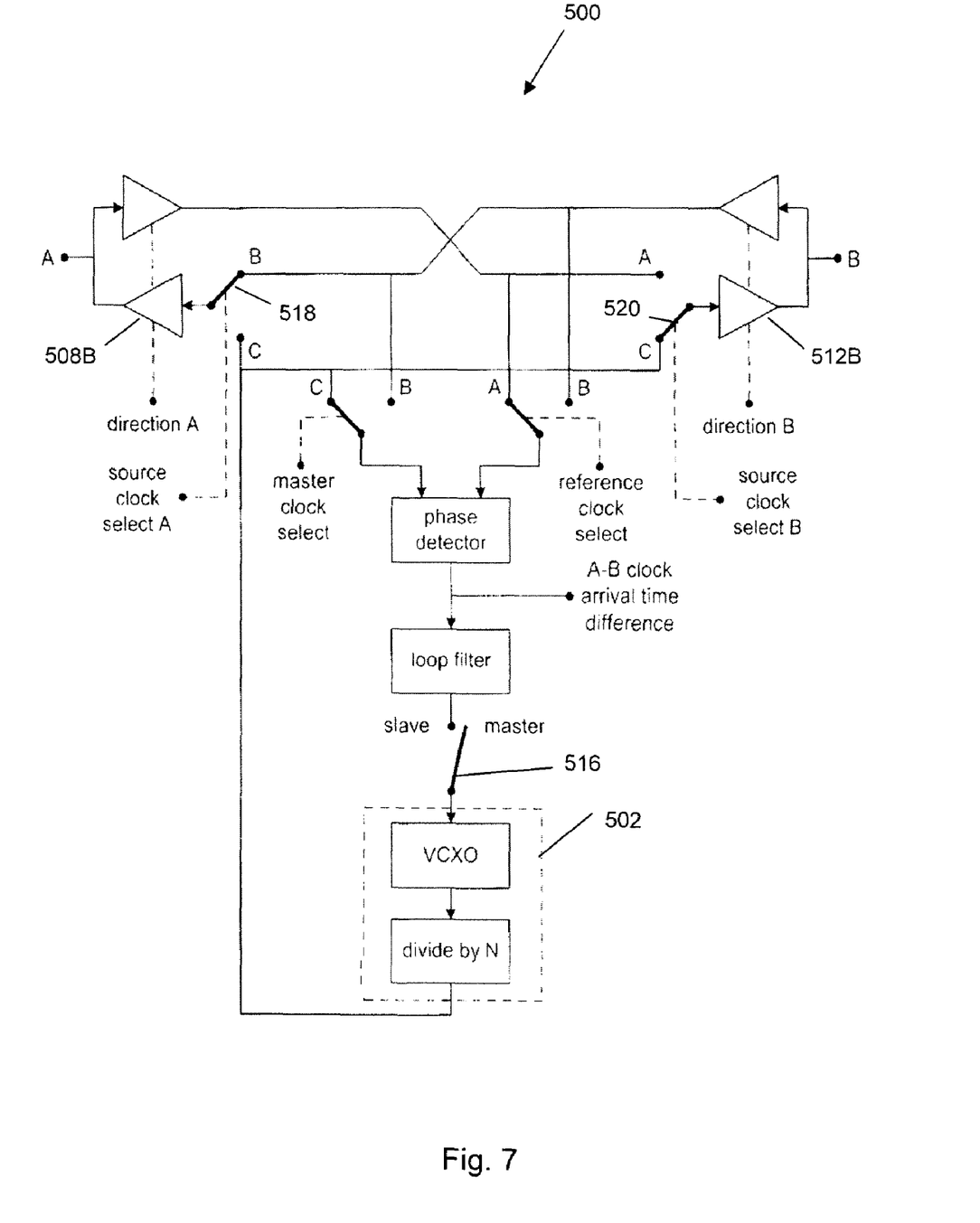
FIG. 7 is a block diagram of a second configuration of the node of FIG. 5 in a second master node configuration.

FIG. 7 is a block diagram of the node 500 in a second master node configuration. The master/slave switch 516 remains in the master position and both output ports 508B and 512B are enabled. Thus, the master node 102 transmits a clock signal simultaneously out of the first and second output ports 508B and 512B onto the network in both directions to the first slave node 104A(see also FIG. 3B).

Figure 8:
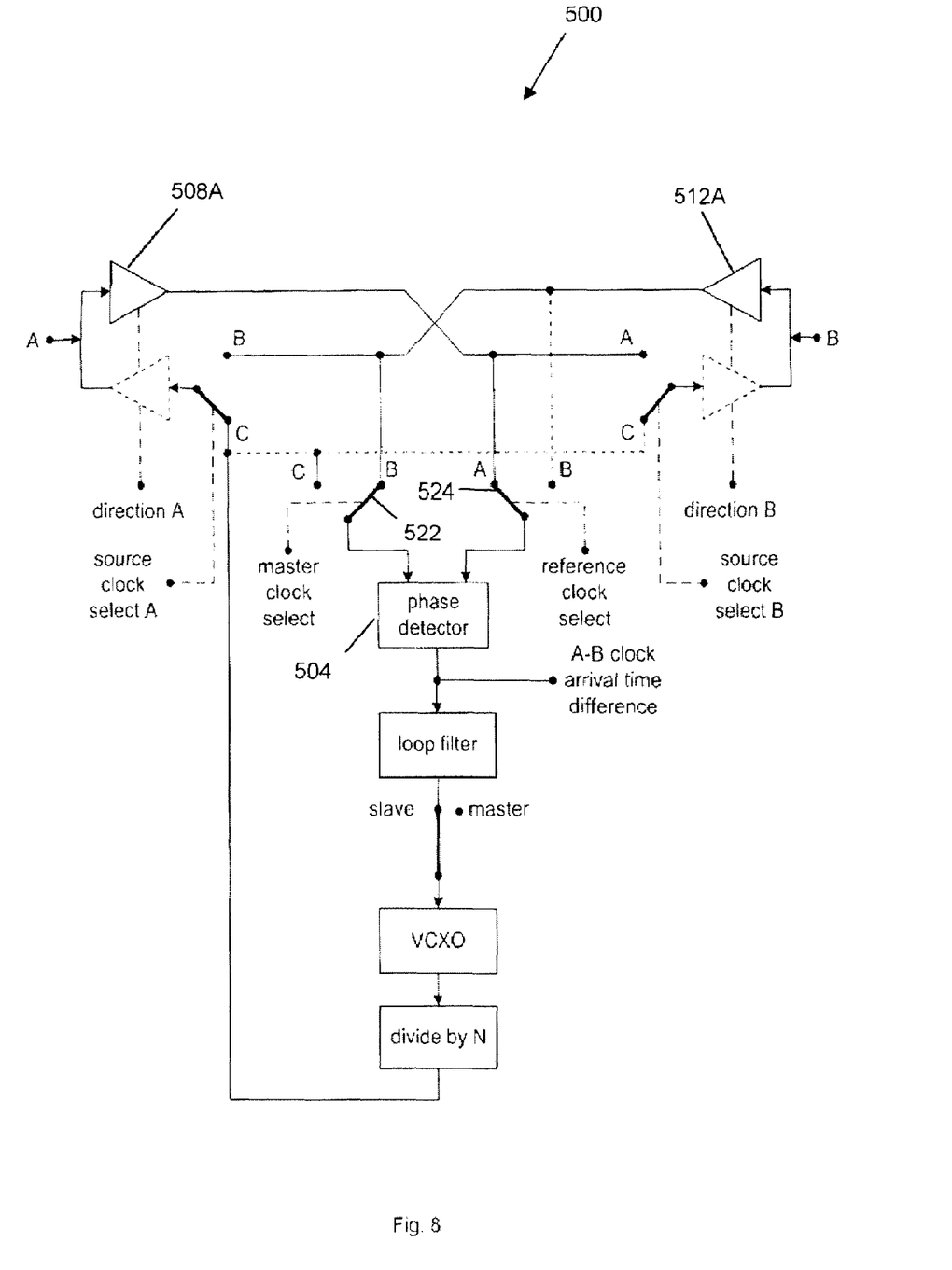
FIG. 8 is a block diagram of a third configuration of the node of FIG. 5 in a slave node configuration.

FIG. 8 is a block diagram of the node 500 in slave node configuration. The master/slave switch 516 is in the slave position and both input ports 508A and 512A are enabled. The master clock select switch 522 is positioned to couple the first detector select input to the second input port 512A and the reference clock select switch 524 is positioned to couple the second detector select input to the first input port 508A. Thus, the slave node may receive through both input ports 508A and 512A the clock signal transmitted by the master node in the second master node configuration described immediately above. The phase detector 504 determines the difference in arrival times between the clock signal received through the first input port 508A and the clock signal received through the second input port 512A and transmits the difference $\text{diff}_1$ to the master node 102, preferably through a separate control network.

As previously noted, the master node then determines the delay $\text{delay}_i$ for each segment of the ring and transmits the delay information to the corresponding slave node 104. A PLL in each slave node's clock portion is then adjusted such that, during normal operation of the network, the clock signals generated by each slave node 104, are both frequency locked and phase locked with the clock signal generated by the master node 102. Consequently, the skew illustrated in FIG. 2 is reduced and the usable bandwidth increased.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A node for a ring topology network having a plurality of ring segments, comprising:
   a first selectable configuration wherein the node comprises means for measuring a transmission time, $diff_0$, of a first clock signal transmitted by the node in a first direction around the network and propagated by each slave node on the network; and
   a second selectable configuration wherein the node comprises means for determining a propagation delay, $delay_i$, for a ring segment associated with each slave node the means for determining comprising:
      means for transmitting a second clock signal in the first direction to a selected slave node, i;
      means for transmitting a third clock signal in a second direction, opposite the first direction, to the selected slave node i, whereby the selected slave node I measures the difference, $diff_i$, in the arrival times of the second and third clock signals;
      means for receiving a signal representative of the difference, $diff_i$, from the selected slave node i;
      means for determining the propagation delay, $delay_i$, for a ring segment associated with the selected slave node i;
      means transmitting a signal representative of the propagation delay, $delay_i$, to the selected slave node i in response to which the selected slave node i adjusts a clock signal generator to compensate for the propagation delay, $delay_i$.

2. The node of claim 1, wherein the means for determining comprises:
   means for determining the propagation delay, $delay_i = (diff_i - diff_{i+1})/2$, for the selected slave node i if i<N, where N equals the number of slave nodes on the network; and
   means for determining a propagation delay, $delay_i = (diff_i + diff_0)/2$, for the selected slave node if i=N.

3. The node of claim 1, further comprising a third selectable configuration wherein, when the node is in the third configuration, the node further comprises:
   means for receiving the first clock signal from a master node from the first direction; receive the second clock signal from a master node from the second direction;
   means for measuring the difference, $diff_i$, between the time the first clock signal was received and the time the second clock signal was received;
   means for receiving a signal from the master node representative of the propagation delay, $delay_i$; and
   means for adjusting a clock signal generation in response to the signal from the master node representative of the propagation delay, $delay_i$, to compensate for the propagation delay, $delay_i$.

4. A node for a ring topology network, comprising:
   a clock signal generator a detector operable to generate a signal representative of a difference between the time a signal is received at a first detector input and the time a signal is received at a second detector input;
   a first selectable configuration wherein the node is operable to:
      transmit a first clock signal onto the network in a first direction and to the first detector input;
      receive the first clock signal at the first detector input;
      receive the first clock signal, propagated by each other node on the network at the second conductor detector input; and
      generate a signal, $diff_0$, representative of a difference between the time the first clock signal was received at the first detector input and the time the clock signal was received at the second detector input; and
   a second selectable configuration wherein the node is operable to:
      transmit a second clock signal from the first output port onto the network in the first direction; and
      transmit a third clock signal from a second output port onto the network in a second direction, opposite the first direction.

5. The node of claim 4, wherein the node is a master node and alternately operates in the first and second configurations.

6. The node of claim 5, further comprising:
   means for receiving the signal, $diff_i$, from each other node on the network; and
   processor means for:
      determining a propagation delay $delay_i = (diff_i - diff_{i+1})/2$ for each other node i<N, where N equals the number of other nodes on the network; and
      determining a propagation delay $delay_i = (diff_i + diff_0)/2$ for another node i=N.

7. The node of claim 6, further comprising means for transmitting a signal representative of the delay, to each other node i on the network.

8. The node of claim 4, further comprising a third selectable configuration wherein the node is operable to:
   receive the second clock signal from the network from the first direction at the first detector input;
   receive the third clock signal from the network from the second direction at the second detector input; and
   generate a signal, $diff_i$, representative of a difference between the time the second clock signal was received at the first detector input and the time the clock third signal was received at the second detector input.

9. The node of claim 8, wherein the node is a slave node and operates in the third configuration.

10. The node of claim 9, further comprising:
    means for receiving a signal from a master node representative of a propagation delay, $delay_i$; and
    means for adjusting the clock signal generator to compensate for the propagation delay, $delay_i$.

11. The node of claim 4, further comprising:
    a first port selectively configurable as a first input port or a first output port;
    a second port selectively configurable as a second input port or a second output port;
    first switching means; and second switching means;
    wherein:
       the node is in a first master node configuration when the first output port and the second input port are enabled, the first switching means is in a first position coupling the output of the clock signal generator to the first detector input and the second switching means is in a first position coupling second input port to the second detector input.

the node is in a second master node configuration when the first and second output ports are enabled and the clock signal is transmitted simultaneously out of the first and second output ports in the first and second directions onto the network; and the node is in a slave node configuration when the first and second input ports are enabled, the first switching means is in a second position coupling the second input port to the first detector input and the second switching means is in a second position coupling the first input port to the second detector input.

12. The node of claim 11 wherein, when the node is in the first master node configuration;

the clock signal is transmitted simultaneously out of the first output port onto the network in the first direction and into the first detector input;

the clock signal is subsequently received from the network from the second direction, opposite the first direction, through the second input port and into the second detector input; and the detector generates a signal representative of a difference between the time the clock signal is received at the first detector input and the time the clock signal is received at the second detector input.

13. The node of claim 11 wherein, when the node is in the slave node configuration:

the clock signal is received from the network from the first direction into the first input port and into the second detector input;

the clock signal is received from the network from the second direction into the second input port and into the first detector input; and the detector generates a signal representative of a difference between the time the clock signal is received at the first detector input and the time the clock signal is received at the second detector input.

14. A ring topology network, comprising:

a master node at least one slave node; and a ring segment for transmission of signals between adjacent nodes, whereby the master node and the at least one slave node are arranged in a ring configuration the master node comprising:

a first selectable configuration wherein the node is operable to measure the transmission time, $diff_0$, of a first clock signal transmitted by the node around the network and propagated by each slave node on the network; and a second selectable configuration wherein the node is operable to determine a propagation delay, $delay_i$ for a ring segment associated with each slave node;

the slave node i comprising a third selectable configuration wherein the node is operable to:

measure the difference $diff_i$, between the time a second clock signal was received from the master node in a first direction and the time a third clock signal was received from the master node in a second direction, opposite the first direction; and in response to receiving from the master node a signal representative of the propagation delay, $delay_i$, adjust a clock signal generator to compensate for the propagation delay, delay.

15. The ring topology network of claim 14, wherein: the master node further comprises:

means for transmitting the first signal in the first direction through each slave node;

means for receiving the first signal from a last slave node;

means for measuring the amount of time, $diff_0$, for the first signal to be transmitted around the ring;

means for transmitting the second signal in the first direction to a slave node i; and means for transmitting a third signal in the second direction to the slave node i;

the slave node i comprises:

means for receiving the second signal; means for receiving the third signal; and means for measuring the difference, $diff_i$, between the receipt of the second signal and the receipt of the third signal;

the master node further comprising:

means for receiving a signal from each slave node i representing the difference, $diff_i$;

means for calculating a ring segment delay, $delay_i$; and means for transmitting a signal representing a ring segment propagation delay, $delay_i$, to a corresponding slave node i; and the slave node i further comprising:

means for receiving the signal representing the ring segment propagation delay; and means for adjusting a local clock signal to compensate for the ring segment delay.

16. The ring topology network of claim 15, wherein the means for transmitting a ring segment propagation delay comprises:

calculating $delay_i=(diff_i-diff_{i+1})/2$ for each slave node i<N, where N equals the number of slave nodes on the network; and calculating $delay_i=(diff_i+diff_0)/2$ for the slave node i=N.

17. A ring topology network having improving bandwidth utilization, comprising:

means for determining a total ring propagation difference, $diff_0$; comprising:

means for transmitting a first test signal from a master node onto the network in a first direction;

means for propagating the test signal by each of the N slave nodes on the network to an adjacent node; and means for receiving the test signal by the master node;

means for determining a ring segment propagation delay, $delay_i$, for each segment in the ring network, comprising:

means for transmitting a second test signal in the first direction to each slave node;

means for transmitting a third test signal in a second direction, opposite the first direction, to each slave node;

means for determining the difference, $diff_i$, for each slave node i between the arrival time of the second test signal and the arrival time of the third test signal; and means for determining the ring segment propagation delay, $delay_i$, for a transmission to each slave node i; and means for adjusting a PLL in each slave node on the network to compensate for the compensating ring segment propagation delay.

18. The network of claim 17, wherein the means for determining the ring segment propagation delay further comprises:

means for calculating $delay_i = (diff_i - diff_{i+1})/2$ for each slave node i<N, where N equals the number of slave nodes on the network; and means for calculating $delay_i = (diff_i + diff_0)/2$ for a slave node i=N.

19. The network of claim 17, wherein the second and third test signals are transmitted to a slave node simultaneously.

* * * * *